Patented Apr. 4, 1939

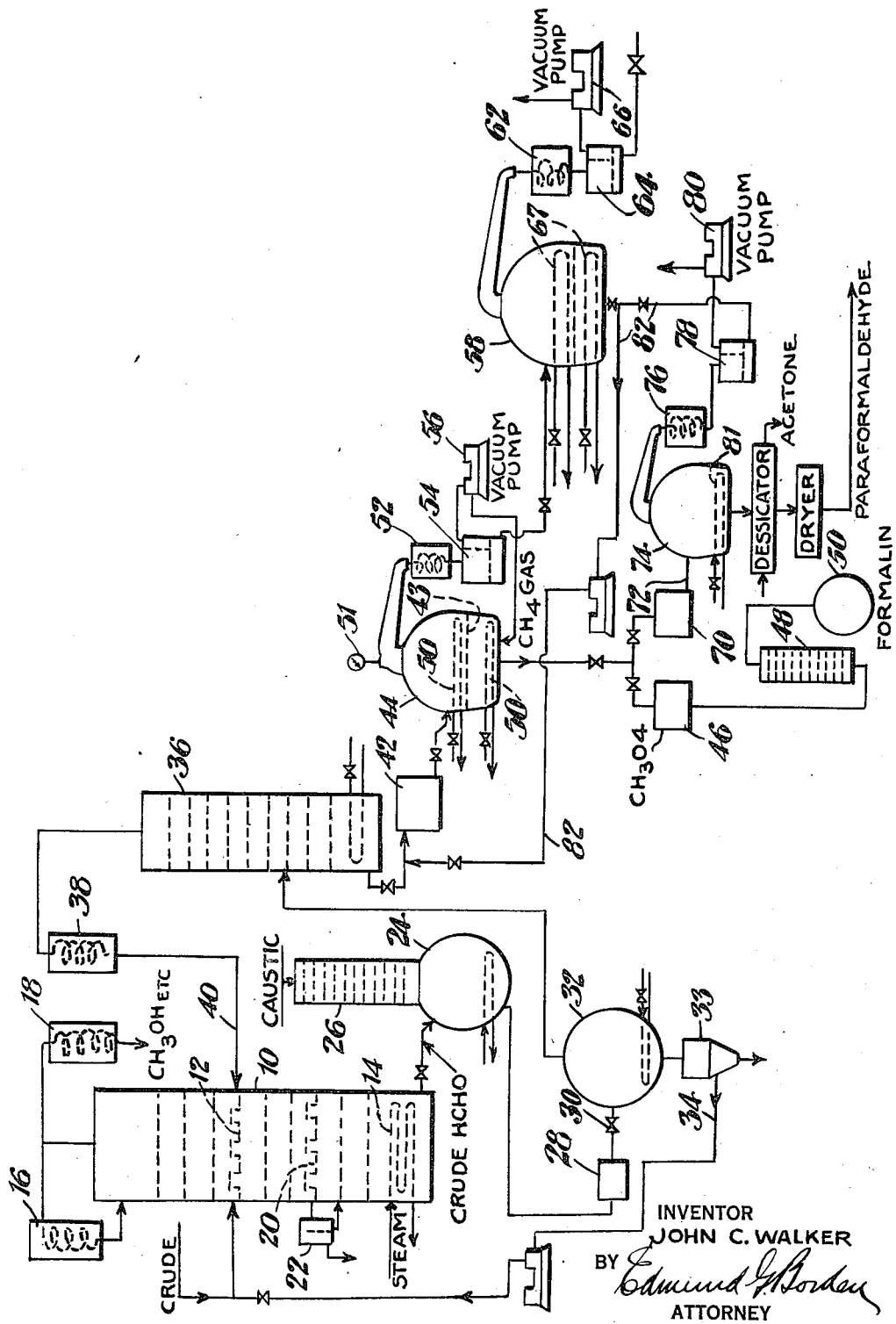

2,153,526

UNITED STATES PATENT OFFICE 2,153,526

REFINING AND CONCENTRATING CRUDE FORMALDEHYDE

John C. Walker, Bartlesville, Okla., assignor to Cities Service Oil Company, Bartlesville, Okla., a corporation of Delaware Application July 28, 1934, Serial No. 737,363

9 Claims. (Cl. 260—606)

This invention relates to the refining and concentration of crude aqueous solutions of formaldehyde, and more particularly concerns an improved method of concentrating the formaldehyde constituent of mixtures of formaldehyde and water.

The primary object of the invention is to provide an improved method for refining crude aqueous solutions of formaldehyde and for concentrating the formaldehyde component thereof up to a strength of at least 37.5% formaldehyde.

Aqueous solutions of formaldehyde cannot always be concentrated satisfactorily by methods heretofore generally employed for such purpose for the reason that such methods involve the fractional distillation of an aqueous formaldehyde solution with the recovery of a distillate which in some cases may have a concentration of formaldehyde not substantially greater than the concentration of formaldehyde in the solution originally treated. Depending upon the formaldehyde concentration of the solution originally treated, such prior methods may yield a vapor which has a high concentration of anhydrous formaldehyde, part of which undergoes polymerization to paraformaldehyde at the temperatures employed, producing sufficient quantities of solid paraformaldehyde to clog the condensers and vapor and distillate lines, making operations difficult and uncertain, while unpolymerized anhydrous formaldehyde is difficult to recover because of its very low boiling point and high vapor pressure.

An important feature of the present invention consists in the concentration of aqueous formaldehyde solutions by vacuum distillation without reflux fractionation under controlled vapor temperature conditions preferably maintained below 90 C., under which temperature conditions the vapors distilled from the solution consist almost entirely of water with small amounts of formaldehyde, the vapors having a considerably lower formaldehyde concentration than the solution under treatment. By carrying out the concentration by boiling without fractionation at a vapor temperature not exceeding 90° C. and under subatmospheric pressures produced by high vacuum exhaust, or by vacuum effect produced by circulation of an inert gas such as methane through the distillation unit, I have succeeded in concentrating in the residue of the distillation treatment upwards of 85% of the original formaldehyde content of aqueous solutions varying in formaldehyde content over the range 27.5 to 42.7%, without any substantial loss of formaldehyde in the form of difficultly recoverable anhydrous formaldehyde.

A further object of the present invention is to provide a process for recovering substantially all of the formaldehyde content of an aqueous formaldehyde solution in the form of a more concentrated formaldehyde solution of commercial strength and purity.

Another object of the present invention is to provide a method for separating, refining and concentrating the formaldehyde content of a crude liquid product of partial oxidation of aliphatic hydrocarbons such as obtained by the treatment of natural gas by the partial oxidation process described in my copending application Serial No. 192,077, filed May 17, 1927.

With the above and other objects and features in view, the invention consists in the improved process of refining and concentrating crude aqueous formaldehyde solutions which is hereinafter described and particularly defined in the accompanying claims.

The process will be hereinafter more particularly defined by reference to the accompanying flow sheet, wherein apparatus of a type adapted or the practice of the invention is illustrated diagrammatically.

I have found that the straight distillation, without rectification such as afforded by a fractionating column, of an aqueous solution of formaldehyde containing between say 5% and 45% formaldehyde by weight, under conditions of vacuum or vacuum effect whereby the temperature of the solution is not allowed to exceed 90° C. and preferably lies in the range 20° C. to 60° C., results in the production of a vapor consisting almost entirely of water having a formaldehyde content much lower than that of the original solution. I have also found that the degree of concentration of formaldehyde in the residual solution remaining in the still is apparently inversely proportional to the temperature obtaining in the still, and directly proportional to the degree of vacuum employed on the still. Apparently the lower the boiling point of the solution is dropped below its normal atmospheric boiling point, the more the vapor pressure of the formaldehyde is lowered as compared to that of water, and the less anhydrous formaldehyde exists in the solution and in the vapors, so that under such conditions water is readily removed from the solution and formaldehyde is concentrated therein without substantial loss of formaldehyde as anhydrous formaldehyde gas carried off in the distillate. For example, I have been able to obtain in the neighborhood of 97% by weight of formaldehyde from a 31% aqueous solution as a residual concentrate containing about 40% by weight formaldehyde, by a single straight vacuum distillation at a vapor temperature of 44° C. and under an absolute pressure of 1.5 inches of mercury.

I will now describe by reference to the accompanying flow sheet how my process can be applied to the recovery, refining, and concentration of the formaldehyde content of a crude aqueous solution of formaldehyde, methanol, acetaldehyde, acetone, and higher alcohols, aldehydes and ketones such as obtained as a product of partial oxidation of natural gas by the process described in my copending application Serial No. 192,077, filed May 17, 1927.

According to the present process the formaldehyde content of the crude liquid product of partial oxidation which is recovered in the aforementioned process of my said copending application, is first obtained as the unvaporized residue of a continuous distillation of the said crude product of partial oxidation in a plate column fractionating still 10 into which the said crude product is continuously charged onto a feed plate 12 located near the centre of the column. Column 10 is heated by a closed bottom steam heating coil 14. A portion of the vapor rising from the head of the column is condensed and returned to the column as reflux by a water cooled partial condenser 16. The remainder of the vapors leaving the top of the column is condensed in a water cooled condenser 18 as a mixture of acetaldehyde, methanol and other relatively low boiling products. At a plate 20 below the feed plate 12 there is continuously drawn off from the column through a decanter 22, a mixture of high boiling water-insoluble alcohols. The crude aqueous formaldehyde solution which normally comprises about 50% by volume of the crude charged to the column, is drawn off as an unvaporized residue from the bottom of the column into a heated neutralizing kettle 24 provided with a superimposed baffled reflux condenser 26. A careful temperature control is applied to hold the still head at an average temperature of about 75° C., and the bottom plate of the column at approximately 99° C.

In kettle 24 the crude aqueous formaldehyde solution which is removed hot from the bottom of column 10, is boiled and thoroughly refluxed over a period which may last 4 or 5 hours with caustic soda in the proportions of 100 to 200 pounds of caustic soda for each 2000 gallons of formaldehyde solution. The amount of caustic soda employed depends on the amount required to completely neutralize any acidity in the formaldehyde solution and to precipitate iron salts and polymerize aldehyde and other impurities. From kettle 24 the hot caustic treated solution of formaldehyde is pumped if desired through a filter press 28 in which any precipitated impurities are separated therefrom; after which the solution is preferably passed by a valved pipe 30 into an evaporator 32 wherein any soluble mineral salts and high boiling alcohol and aldehyde or polymeric impurities remaining in the solution are separated by distilling the formaldehyde overhead, leaving the said impurities as a residue which may be separated from the caustic in 33 and further processed or returned by pipe 34 to the crude column still 10. Vapors of the aqueous formaldehyde are withdrawn from the top of evaporator 32 into the mid-zone of a continuous plate fractionating column 36 in which fractional condensation takes place, with the recovery of a partially purified aqueous formaldehyde distillate at the base of the column, and removal of volatile impurities as vapors from the top of the column. The operating temperature of column 36 is carefully controlled to hold the bottom plate at about 100° C. and the top plate at about 90° C. The vapors of impurities thus taken off the top of column 36 may be condensed in a condenser 38 and returned by a pipe 40 to the feed plate of still 10. The partially purified formaldehyde solution thus recovered at the base of the fractionating column 36 may be conducted to a storage vessel 42. If found desirable this formaldehyde solution may be subjected to a second stage of purification with caustic or with some other suitable purifying reagent such as sodium acetate, activated charcoal or iron filings, and also to a second stage of evaporation to remove high boiling impurities, before conducting it to storage tank 42.

The solution which is collected in storage tank 42 when practicing the previously described operations, normally carries from 20 to 35% by weight of formaldehyde and must be concentrated to upwards of 40% strength when recovery of U. S. P. formalin is desired. To effect this concentration a charge of the solution is periodically introduced onto a perforate or apertured feed plate 43 of a vacuum concentrator still 44 which operates discontinuously as a batch still operating without fractionation and under carefully controlled temperature and vacuum conditions. Still 44 is normally operated under an absolute pressure of below 1 inch to 5 inches of mercury and at a temperature of 20° C. to 60° C. When the dilute formaldehyde solution is boiled under these conditions a distillate is produced which normally consists almost entirely of water together with approximately 4% to 8% formaldehyde by weight; leaving a residual concentrate in the still which, if the purpose is to produce U. S. P. formalin, should contain approximately 41–44% formaldehyde by weight. It will be understood that the dilute aqueous solution is usually boiled in the still until the concentrate has the desired strength. In some cases, however, where the original formaldehyde solution treated has a relatively low formaldehyde concentration, it has been found advantageous to concentrate to approximately 18 to 25% strength in the vacuum still 44, and to follow this treatment with a second similar stage of vacuum concentration. To produce U. S. P. formalin, the concentrate remaining at the end of the concentrating treatment is drawn off into a tank 46 wherein it is stabilized by addition of methanol to bring the concentration within the specifications for 37% U. S. P. formalin. Following stabilization with methanol, the stabilized formaldehyde solution is withdrawn from tank 46 through a filter bed of charcoal, fuller's earth or zeolite (green sand) in chamber 48, the product resulting from this treatment being stored as finished U. S. P. formalin.

In order to afford close temperature control of the operation of vacuum still 44, the heating is effected by steam coils 50, and a vacuum gauge 51 and thermometers are provided for controlling the temperature. The vapors which are removed from the top of still 44 pass directly into a condenser 52 without fractionation, and the condensate is recovered in a separator 54. Any small amount of uncondensed anhydrous formaldehyde and incondensable gases is removed from the separator by vacuum pump 56, and the operation of this pump is carefully controlled to hold the desired high vacuum and low temperatures on the still 44 during the entire heating operation. As the concentration of aqueous formaldehyde in still 44 continues, with consequent volume shrinkage due to water removed through condenser 52, additional volumes of the charging stock can be added to still 44 by feeding directly to the still or on the perforate plate 43. In this manner it is possible to operate my process semi-continuously as compared to a single batch charge. By suitable valve control in the pipes connecting still 44 with storage tank 46 it is also possible to operate the process continuously by steadily withdrawing concentrate from the still below plate 43, and continuously feeding into the still and on to plate 43 fresh charging stock. In operating my process no limitations are necessary as to the position in the system where vacuum need be applied, although the vacuum is preferably applied to receiver 54 as a matter of convenience. While any conventional apparatus suitable for evacuation and maintaining vacuum will be satisfactory for use in my process, the evacuating effect of sweeping volumes of inert or non-reacting gases such as methane, thru the system while distillation proceeds, will assist in maintaining lowered formaldehyde vapor pressures and may be used to supply the vacuum effect necessary to my process.

The formaldehyde solution which is collected in separator 54 is relatively weak, usually containing in the neighborhood of 4% to 8% by weight of formaldehyde. This solution may be advantageously concentrated in a second vacuum or vacuum effect concentrator 58 operated discontinuously without fractionation to produce a weak distillate of about 1.0% formaldehyde by weight, together with a residual concentrate which may contain in the neighborhood of 25% formaldehyde by weight, and which at the end of each run is removed from the concentrator 58 and pumped back through pipe 60 into storage tank 42 for rerunning through still 44. A controlled pressure of less than 2 inches of mercury absolute is preferably held on still 58 during its period of operation by means of vacuum pump 66, and the still is heated by means of steam coil 67.

My process can be used to advantage in the manufacture of solid para-formaldehyde from aqueous formaldehyde solutions by concentrating aqueous formaldehyde containing from 40 to 50% by weight formaldehyde under sub-atmospheric pressures until still residues have been sufficiently concentrated that when dumped from the still they will congeal and solidify to paraformaldehyde.

To produce paraformaldehyde, the formaldehyde remaining as a concentrate residue in still 44 is pumped into a tank 70 and from there is passed through a pipe 72 into a third vacuum concentrator still 74 wherein it is converted by batch distillation under vacuum into a residual concentrate containing upwards of 75% formaldehyde by weight, at the same time recovering an overhead distillate normally containing in the neighborhood of 20% by weight of formaldehyde. This distillate is recovered by condensation of the vapors taken off from still 74 in a condenser 76, and separation of liquid condensate in a separator 78. A pump 80 preferably pulls a high vacuum of at least 27.5 to 28 inches mercury on concentrator 74 during its operation, and steam coils 81 supply the heat for completing the distillation concentration. The distillate thus recovered in separator 78 is of such relatively high formaldehyde concentration that it can be advantageously pumped back directly through a pipe 82 into storage tank 42 preparatory to rerunning through still 44. The paraformaldehyde concentrate which collects in the bottom of still 44 is removed from the still at the completion of a run and may be readily converted into 96% paraformaldehyde by subjecting it in a dessicator to a light solvent extraction treatment with acetone for the purpose of taking up its water; followed by filtration of the paraformaldehyde, and drying of the filter cake.

Many distillations have been made confirming these discoveries, and in Table I, below, the results of some of these distillations have been given to illustrate the effect of sub-atmospheric pressure distillations on the resultant distillates. With a normal barometer of 29.4 inches mercury at my plant location, Table I shows the effect of sub-atmospheric pressure distillations at six different pressures on seven formaldehyde solutions of concentration ranging from 42.3% by weight to 1.07% by weight.

Table I

| | Absolute pressure, inches Hg | Percent by weight formaldehyde | | Temperature, °C. | |
|---|---|---|---|---|---|
| | | Charge | Distillate | Liquid | Vapor |
| Atmospheric | 29.4 | 42.3 | 36.4 | 100.5 | 97.7 |
| | 18.0 | | 24.7 | 90.5 | 86.7 |
| | 10.1 | | 19.6 | 78.5 | 73.5 |
| | 5.0 | | 11.1 | 62.5 | 57.0 |
| | 2.0 | | 4.7 | 44.0 | 41.0 |
| | 1.0 | | 2.1 | 33.0 | 36.5–33.8 |
| Do | 29.4 | 30.1 | 30.1 | 100.2 | 97.5 |
| | 18.0 | | 21.5 | 90.6 | 86.7 |
| | 10.0 | | 16.4 | 78.0 | 73.5 |
| | 5.0 | | 8.8 | 61.0 | 56.7 |
| | 2.0 | | 3.6 | 43.0 | 38.5 |
| | 1.0 | | 2.4 | 33.0 | 30.5 |
| Do | 29.5 | 20.0 | 20.3 | 100 | 97.0 |
| | 18.0 | | 17.2 | 87 | 86.0 |
| | 10.0 | | 10.6 | 76.5 | 73.5 |
| | 5.0 | | 6.7 | 60.5 | 57.5 |
| | 2.0 | | 3.5 | 40 | 38.5 |
| | 0.9 | | 2.5 | 39.5–37.5 | 31.5–29.5 |
| Do | 29.5 | 10.5 | 12.0 | 99.7 | 97.5 |
| | 18.0 | | 8.8 | 89.6 | 86.5 |
| | 10.0 | | 6.4 | 77.0 | 73.5 |
| | 5.0 | | 4.0 | 59.5 | 56.0 |
| | 2.0 | | 2.1 | 40.0 | 37.8 |
| | 0.9 | | 1.2 | 30.5–25.5 | 28.5–27.5 |
| Do | 29.5 | 5.3 | 6.5 | 100 | 98 |
| | 10.0 | | 2.9 | 75.0 | 71.4 |
| | 5.0 | | 2.2 | 59.3 | 56.5 |
| | 2.0 | | 1.5 | 39.7 | 37.6 |
| | 1.0 | | 0.66 | 29–27 | 27.5–26 |
| Do | 29.0 | 2.15 | 2.6 | 100.5 | 98.5 |
| | 18.0 | | 1.4 | 88 | 86 |
| | 10.0 | | 0.83 | 74–75 | 71.5–72 |
| | 9.0 | | 0.60 | 60 | 57 |
| | 2.0 | | 0.31 | 39.2–41 | 28.2–38.8 |
| | 1.0 | | 0.17 | | |
| Do | 29.5 | 1.07 | 2.2 | 100.5 | 98.5 |
| | 18.0 | | 1.0 | 87.5 | 86 |
| | 10.0 | | 0.6 | 74.5–76 | 72 |
| | 5.0 | | 0.35 | 58.7 | 56.5 |
| | 2.0 | | 0.21 | 40 | 38–39.5 |
| | 1.0 | | 0.12 | 28.5–30 | 27.5–28.5 |

Apparently such formaldehyde as does distil over in such limited amounts as defined in Table I is neither anhydrous nor polymerized, and the disadvantages of clogging of the equipment due to paraformaldehyde, and losses due to non-condensable formaldehyde, described above as characteristic of the ordinary methods of concentration, are eliminated by my process. My process is preferably operated at absolute pressures of one-tenth inch to three inches of mercury. The effects achieved in operating my process on aqueous formaldehyde solutions of different strengths, and the high efficiencies obtained in effecting formaldehyde recoveries are detailed in Table II, following, which table has been compiled from results obtained in practicing my invention in a commercial scale plant:

*Table II*

| Absolute pressure, inches Hg. | Percent formaldehyde by weight | | | Average temperature °C. | | Percent formaldehyde recovery in concentrate |
|---|---|---|---|---|---|---|
| | Charge | Distillate | Concentrate | Liquid | Vapor | |
| 2.1-0.9 | 7.7 | 2.7 | 18.8 | 38 | -- | 65.0 |
| 3.3 | 27.7 | 7.6 | 42.5 | 59 | 55 | 86.2 |
| 2.9 | 27.5 | 7.1 | 42.5 | 55 | 54 | 89.2 |
| 1.8 | 31.1 | 6.6 | 42.8 | 45 | 44 | 97.1 |
| 1.5 | 31.3 | 4.2 | 40.1 | 45 | 44 | 97.3 |
| 2.0 | 38.3 | 4.5 | 86.6 | 58-78 | -- | 83.7 |
| 2.0 | 42.7 | 4.3 | 70.5 | 58-78 | -- | 93.4 |

The relatively small amounts of such chemical compounds as remain as impurities in formaldehyde after ordinary fractionating steps, and are removable only by long and tedious fractionation or other treating steps, are readily removed from the formaldehyde solutions by the distillation of the crude formaldehyde under sub-atmospheric pressures in accordance with the process herein described. Apparently in so distilling, the boiling points of these various chemical compounds are sufficiently reduced as to permit of their distillation along with water, leaving the formaldehyde still residues not only concentrated as to formaldehyde content, but stripped clean of these impurities.

The invention having been thus described, what is claimed as new is:

1. A process of refining and concentrating crude aqueous solutions of formaldehyde of below 35% strength which comprises refining the crude solution and separating impurities therefrom by boiling with caustic soda, distilling and subjecting the vapors to fractional condensation, and concentrating the aqueous formaldehyde condensate by vacuum distillation without fractionation at a temperature not exceeding 90° C.

2. A process of concentrating an aqueous formaldehyde solution which comprises boiling such solution under an absolute pressure not exceeding 5″ of mercury at a temperature not exceeding 90° C. for a sufficient period to raise the formaldehyde concentration of the residual solution while taking off vapors of dilute formaldehyde overhead.

3. The process of concentrating a dilute aqueous formaldehyde solution which comprises subjecting said solution to distillation without rectification at a temperature in the range 20° to 60° C. and at an absolute pressure not exceeding 5 inches of mercury, and removing overhead vapors consisting almost entirely of dilute formaldehyde of lower concentration than that of said aqueous solution.

4. The process of concentrating an aqueous formaldehyde solution which comprises boiling such solution without rectification at a temperature below 60° C. under an absolute pressure of less than 5 inches of mercury to yield a residual concentrate of increased strength, and carrying out the operation under conditions to produce a distillate substantially free of anhydrous formaldehyde and consisting essentially of dilute formaldehyde of lower concentration than the original solution.

5. A process of refining and concentrating a crude dilute aqueous formaldehyde solution which comprises boiling the formaldehyde solution at a temperature below 60° C. and under an absolute pressure of 0.1 inch to 5 inches mercury to produce a residual concentrate of increased formaldehyde content.

6. A process as defined in claim 1 in which the formaldehyde concentrate is stabilized by addition of methanol, and the stabilized concentrate is then finally purified by filtration through a cleansing material of the class consisting of activated carbon, zeolite, and fuller's earth.

7. The process of concentrating an aqueous formaldehyde solution of below 35% strength which comprises, boiling the same at a temperature below the normal atmospheric boiling point of the solution and at an absolute pressure of 0.1 inch to five inches of mercury, and separating therefrom by distillation overhead vapors consisting essentially of dilute formaldehyde of concentration less than that of the original solution.

8. The process of concentrating an aqueous formaldehyde solution which comprises, boiling the same under 1 inch to 5 inches of mercury absolute pressure, and driving off therefrom aqueous formaldehyde vapors of lesser concentration than that of said aqueous solution.

9. The process of refining the formaldehyde content of a crude aqueous solution of formaldehyde, methanol, acetaldehyde, acetone and higher boiling alcohols and aldehydes, which comprises fractionally distilling said crude mixture under conditions to yield as a residue a crude aqueous formaldehyde solution, and concentrating the aqueous formaldehyde by boiling under vacuum without rectification at a temperature below 60° C. for a period of time sufficient to raise the concentration while taking off vapors of dilute formaldehyde overhead.

JOHN C. WALKER.